United States Patent
Ishiwata et al.

(10) Patent No.: US 9,183,882 B2
(45) Date of Patent: Nov. 10, 2015

(54) MOVING-IMAGE PLAYBACK DEVICE

(71) Applicant: Kabushiki Kaisha Toshiba, Tokyo (JP)

(72) Inventors: Shunichi Ishiwata, Chiba (JP); Yoshiro Tsuboi, Chiba (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/192,794

(22) Filed: Feb. 27, 2014

(65) Prior Publication Data

US 2014/0294368 A1 Oct. 2, 2014

(30) Foreign Application Priority Data

Mar. 29, 2013 (JP) ................................. 2013-073095

(51) Int. Cl.
*H04N 9/87* (2006.01)
*G11B 27/00* (2006.01)
*G06T 3/40* (2006.01)

(52) U.S. Cl.
CPC ............ *G11B 27/005* (2013.01); *G06T 3/4007* (2013.01); *H04N 9/87* (2013.01)

(58) Field of Classification Search
None
See application file for complete search history.

(56) References Cited

U.S. PATENT DOCUMENTS

| | | | |
|---|---|---|---|
| 5,822,493 A | 10/1998 | Uehara et al. | |
| 6,658,056 B1 | 12/2003 | Duruoz et al. | |
| 6,665,450 B1 | 12/2003 | Cornog et al. | |
| 7,103,231 B2 | 9/2006 | Cornog et al. | |
| 7,333,545 B2 | 2/2008 | Duruoz et al. | |
| 7,408,986 B2 | 8/2008 | Winder | |
| 8,279,921 B2 | 10/2012 | Anada | |
| 2004/0136689 A1* | 7/2004 | Oka | 386/52 |
| 2007/0150925 A1* | 6/2007 | Fujishiro | 725/93 |
| 2007/0263100 A1 | 11/2007 | Anada | |
| 2008/0199156 A1* | 8/2008 | Uchiike et al. | 386/124 |

FOREIGN PATENT DOCUMENTS

| | | |
|---|---|---|
| JP | H06-078279 A | 3/1994 |
| JP | H08-237592 | 9/1996 |
| JP | 2001-042831 | 2/2001 |
| JP | 2006-140551 | 6/2006 |
| JP | 2006-319645 A | 11/2006 |
| JP | 2010-166386 | 7/2010 |
| JP | 2011-061709 | 3/2011 |
| JP | 2011-082899 | 4/2011 |

OTHER PUBLICATIONS

Office Action dated Jun. 22, 2015 in corresponding Japanese Application No. 2013-073095, 4 pgs.

* cited by examiner

*Primary Examiner* — Hung Dang
*Assistant Examiner* — Sunghyoun Park
(74) *Attorney, Agent, or Firm* — Knobbe, Martens, Olson & Bear, LLP

(57) ABSTRACT

According to a moving-image playback device of an embodiment of the invention, a frame rate control circuit uses an input interval Tc of a plurality of input images in an input video, a display interval Td of a plurality of display images in a display video, and a time extension magnification N of the display video with respect to the input video as inputs and that outputs the number "m" of images of the same content and a constant "n" greater by one than the number "a" of interpolation images which are each inserted between the input images.

The frame rate control circuit outputs the number "m" of images and the constant "n", which are determined based on a combination (m, n) of a natural number for satisfying an equation of n×m=N×Tc/Td, to the interpolation image generation circuit.

7 Claims, 5 Drawing Sheets

MOVING-IMAGE PLAYBACK DEVICE

CROSS-REFERENCE TO RELATED APPLICATIONS

This application is based upon and claims the benefit of priority from the prior Japan Patent Application. No. 2013-073095, filed on 29 Mar. 2013, the entire contents of which are incorporated herein by reference.

FIELD

Embodiments described herein relate generally to a moving-image playback device.

BACKGROUND

In recent years, a program has been well known, which processes typical moving-image content rather than a video which is captured at high speed and creates a smooth slow motion moving-image on a computer. This program creates the smooth slow motion moving-image by interpolating a new image frame between input images of time series which makes up the recorded moving-image content. This program has already been put to practical use in movie production or the like and, for example, "Twixtor", produced by RE: Vision Effects Inc., US, has been known.

In order to create the smooth slow motion moving-image by executing the frame interpolation using the above program, however, hardware and software having high processing capability are required. For this reason, it is difficult to apply the program to an inexpensive moving-image playback device such as a home television.

In addition, there has been known a technique for improving display characteristics by generating interpolation frames between display frames in order to prevent the blurring of the moving-image due to a hold effect of a liquid crystal in the moving-image playback device, but this technique is not related to a slow motion playback.

DETAILED DESCRIPTION

According to a moving-image playback device of an embodiment of the invention, a frame rate control circuit uses an input interval Tc of a plurality of input images in an input video in which the plurality of input images are arranged in time series, a display interval Td of a plurality of display images in a display video in which the plurality of display images are arranged in time series, and a time extension magnification N of the display video with respect to the input video as inputs and that outputs the number "m" of images of the same content which is continuously output in the display video and a constant "n" greater by one than the number "a" of interpolation images which are created with an independent display content and are each inserted between the input images.

An interpolation image generation circuit inputs the input video, creates the number "a" of interpolation images based on the constant "n", and creates an immediately preceding input image or the interpolation image and a re-display image of the same content between the input images in time series based on the number "m" of images to output the display video of the time extension magnification N.

The frame rate control circuit outputs the number "m" of images and the constant "n", which are determined based on a combination (m, n) of a natural number for satisfying an equation of $n \times m = N \times Tc/Td$, to the interpolation image generation circuit.

Hereinafter, each embodiment of the invention will be described in detail with reference to the drawings.

First Embodiment

Figure 1:
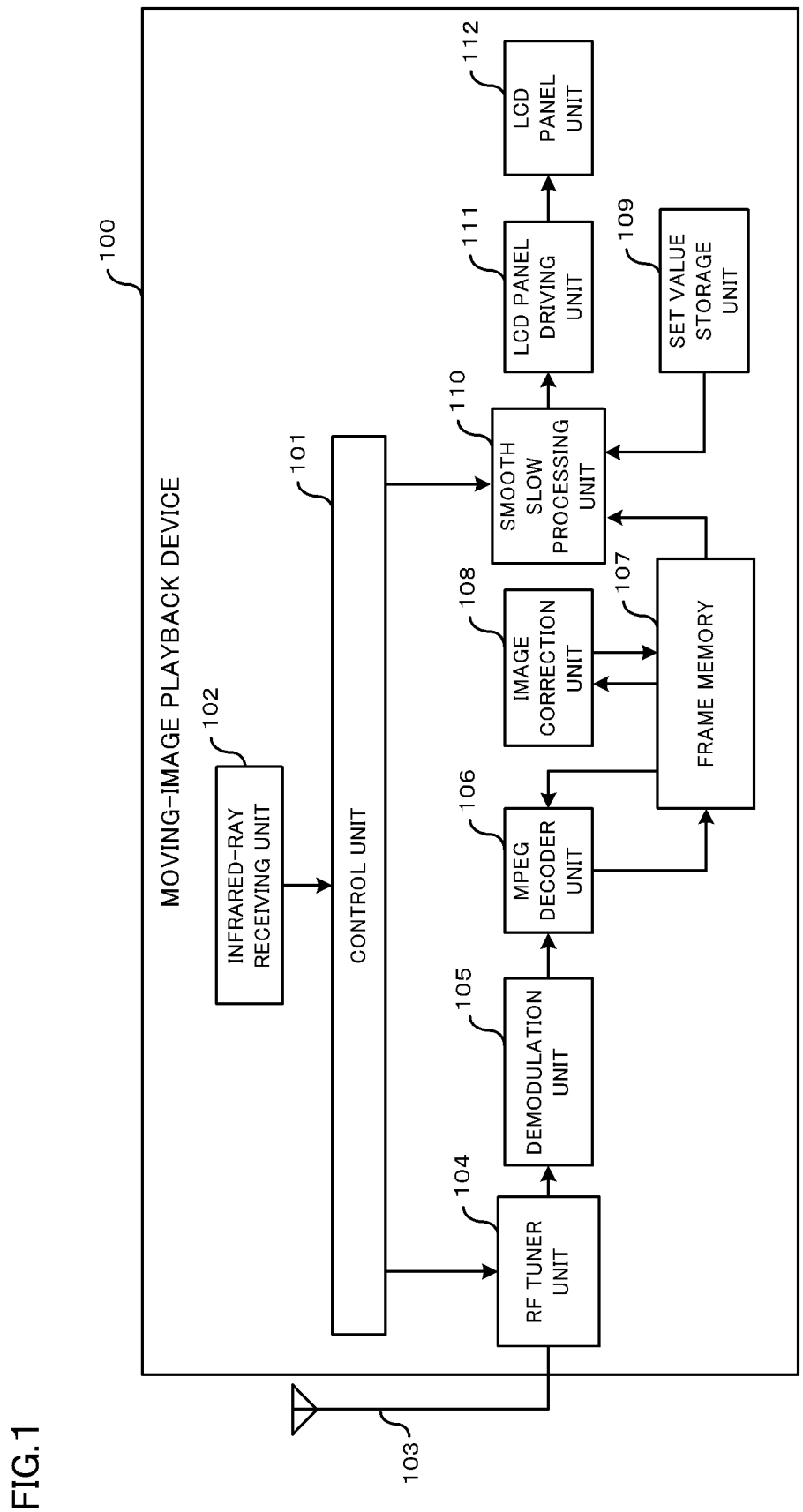
FIG. 1 is a block diagram illustrating a configuration example of a moving-image playback device according to a first embodiment of the invention.

FIG. 1 is a block diagram illustrating a configuration example of a moving-image playback device 100 according to a first embodiment of the invention. A control unit 101 is a control device such as a CPU which controls the operation of each unit constituting the moving-image playback device 100. An infrared-ray receiving unit 102 receives an infrared ray which is output from a remote control (not illustrated) by user's operation and outputs the light received signal to the control unit 101. The control unit 101 has a function of outputting control information, which changes a selection channel number "c" based on the light received signal output by the infrared-ray receiving unit 102, to a RF tuner unit or a function of outputting control information, which changes a time extension magnification N, to a smooth slow processing unit 110.

An antenna 103 is provided outside the moving-image playback device 100 to receive radio waves. The antenna 103 is connected to the RF tuner unit 104 using a wiring.

The RF tuner unit 104 determines a receiving frequency of broadcast wave based on a control signal of the selection channel number "c" output from the control unit 101 and outputs an intermediate frequency (IF) signal acquired by a frequency mixture with a local oscillator (not illustrated) to a demodulation unit 105.

The demodulation unit 105 demodulates the intermediate frequency signal, which is modulated by a modulation system (for example, OFDM, VSB or the like) based on various digital TV broadcasting standards (for example, ISDB or ATSC, DVB or the like), into an MPEG transport stream, which is a digital signal, and outputs the demodulated signal to an MPEG decoder unit 106.

The MPEG decoder unit 106 decodes the MPEG transport stream, which is output from the demodulation unit 105, based on an encoding system such as MPEG2 or MPEG4/

AVC (H. 264) and outputs the decoded image to a frame memory 107. At this time, a frame rate Fc of the decoded image is encoded in the MPEG transport stream being broadcasted and, for example, has a value of 24 fps or 30 fps. In addition, the MPEG decoder unit 106 has a function of reading out a reference image from the frame memory 107 and also performs decoding using motion compensation. The frame memory 107 is a main storage device such as a DRAM which has a capacity capable of storing sixteen decoded images, for example.

An image correction unit 108 reads out the decoded image written on the frame memory 107 at the frame rate Fc, for example, executes a correction processing or a conversion processing of image, as below, and writes back the processing result in the frame memory 107 at the frame rate Fc.

(1) Gamma correction or more detailed tone curve correction processing (2) Adjustment processing of brightness or contrast (3) Processing for converting into YUV 4:4:4 format by expanding a color difference of decoded image of YUV 4:2:0 format (4) Processing for converting into HD resolution by performing conversion/expansion and pillar boxing of a pixel aspect ratio of video being broadcasted with SD resolution of 720×480 pixels (5) Processing for converting into 1920×1080 pixels by expanding the resolution of the broadcast wave being broadcasted by 1440×1080 pixels in a horizontal direction A set value storage unit 109 is an auxiliary storage device such as an HDD which previously stores set values of an input interval Tc of a plurality of input images in an input video in which the plurality of input images are arranged in time series, a display interval Td of a plurality of display images in a display video in which the plurality of display images are arranged in time series, and an updating interval Tf of a display content of the display image in the display video. An input interval Tc may be calculated as the inverse of a frame rate Fc, or may be calculated from time stamps in an MPEG stream. The Tc is not necessarily fixed depending on the time stamps.

The smooth slow processing unit 110 creates a display video (smooth slow moving-image), which is obtained by extending the input video stored in the frame memory 107 with the time extension magnification N, based on the time extension magnification N output from the control unit 101 and the set values Tc, Td, and Tf acquired from the set value storage unit 109 and outputs the display video to an LCD panel driving unit 111.

The LCD panel driving unit 111 outputs the display video (smooth slow moving-image) together with an LCD panel control signal such as a horizontal synchronization signal or a vertical synchronization signal to an LCD panel unit 112.

Figure 2:
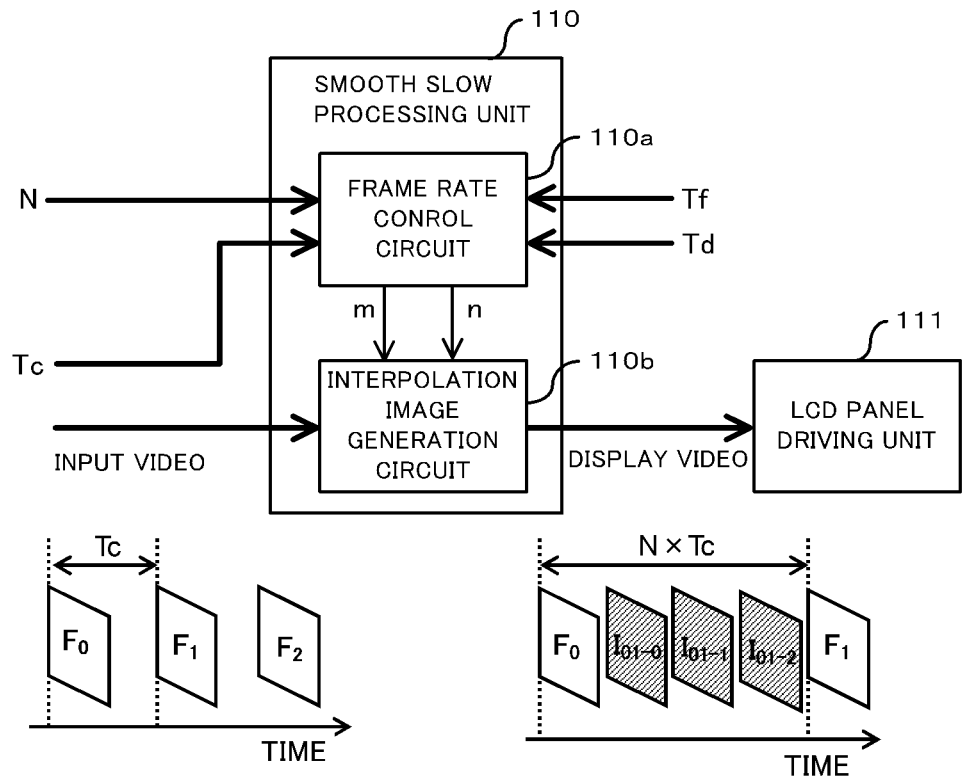
FIG. 2 is a diagram illustrating a configuration example of a smooth slow processing unit illustrated in FIG. 1.

FIG. 2 is a diagram illustrating a configuration example of the smooth slow processing unit 110 illustrated in FIG. 1. The smooth slow processing unit 110 is made up of a frame rate control circuit 110a and an interpolation image generation circuit 110b.

The frame rate control circuit 110a outputs values of "m and n" which determine the configuration ratio of the image in the display video which is obtained by extending the input video with Tc, Td, Tf, and N as inputs to the interpolation image generation circuit 110b. The value of "m" indicates the number of images of the same content which is continuously output to the display video. The value of "n" is a constant greater by one than the number "a" of interpolation images which are created with an independent display content and are each inserted between the input images. The values of "m and n" are a natural number.

The interpolation image generation circuit 110b inputs the input video from the frame memory 107 and also inputs the number "m" of images and the constant "n" from the frame rate control circuit 110a. Then, the interpolation image generation circuit 110b creates the number "a" of interpolation images based on the constant "n" and also creates an immediately preceding input image (or interpolation image) and the display image (hereinafter, referred to as "re-display image") of the same content between the input images in time series based on the number "m" of images to output the display video, which is obtained by extending the input video with time extension magnification N, to the LCD panel driving unit 111. Further, when the number "m" of images is 1, the re-display image is not created, and the display video is created based on the input image and the interpolation image.

FIG. 2 illustrates a case of satisfying the conditions of Tf=1×Td and 4×Tc=8×Tf. That is, since the input time extension magnification N is 4, three interpolation images $I_{01-0}$, $I_{01-1}$, and $I_{01-2}$ are interpolated between input images $F_0$ and $F_1$ at the interval Td.

Generally, assuming that all of the input images I are displayed at equal intervals, the relation between the input image F and the interpolation image I on time series is expressed by the following Equations 1 and 2.

$$Tf = m \times Td \quad \text{Equation 1}$$

$$N \times Tc = n \times Tf \quad \text{Equation 2}$$

Each symbol is represented as follows.

Tc: Interval of the input image I

Tf: Updating interval of the display content

Td: Display interval of the display video in a display device

N: Time extension magnification of the display video with respect to the input video m: Number of same images which are continuously displayed in the display device n: "a" (number of independent interpolation images I created between input images F)+1

The time extension magnification N is a value which is set from the outside of the device by user's operation. In addition, the values Tf and Tc are determined by the input, and the value Td is a value determined by the performance of the display device.

Here, substituting Equation 1 into Equation 2, it satisfies the equation of N×Tc=n×m×Td. In a case of deforming this equation, the following Equation 3 is derived.

$$n \times = N \times Tc/Td \quad \text{Equation 3}$$

Accordingly, the number of images displayed between the input images F is determined by a combination of the values "m and n" (m and n are natural numbers, respectively) to satisfy Equation 3. For example, when N=4 and Tc/Td=2, the frame rate control circuit 110a outputs a combination (m, n) which satisfies the relation of n×m=8 from Equation 3. Further, as the number "m" of images becomes small, the re-display image is reduced, and thus the display video becomes smooth. For this reason, one is selected as a value of "m" in many cases.

The interpolation image generation circuit 110b executes any one of the following three kinds of operations for each display image frame according to the combination (m, n) output by the frame rate control circuit 110a.

1. Output the input image F as it is.
2. Create and output the interpolation image I from the input image F.
3. Output again the immediately preceding display image.

Further, a creating means of the interpolation image I is not particularly limited in the first embodiment. For example, as in the known technique, the interpolation image I may be created using motion vector information. In addition, the interpolation image I may be generated by multiplying pixels of the input image F before and after the interpolation image I by a weighting coefficient without using the motion vector information.

Figure 3:
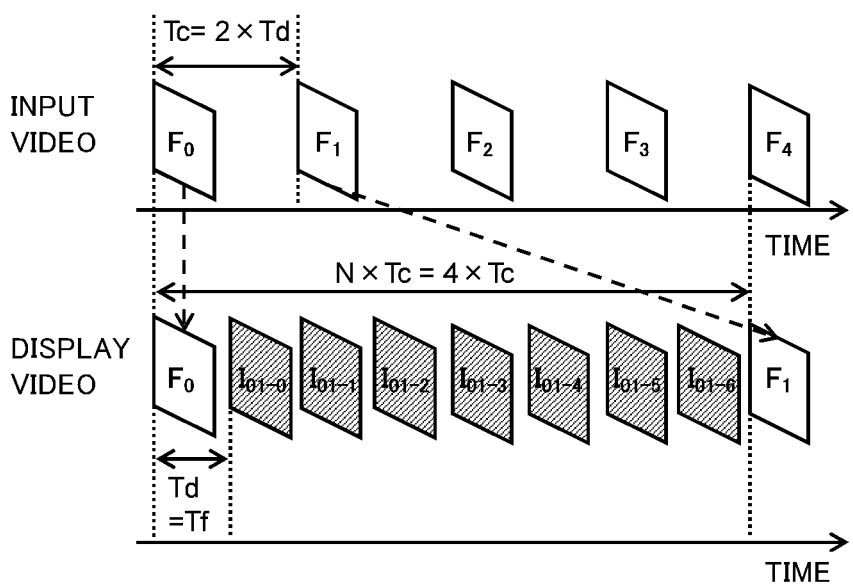
FIG. 3 is a diagram for describing a method of creating a display video from an input video by the moving-image playback device illustrated in FIG. 1.
Figure 4:
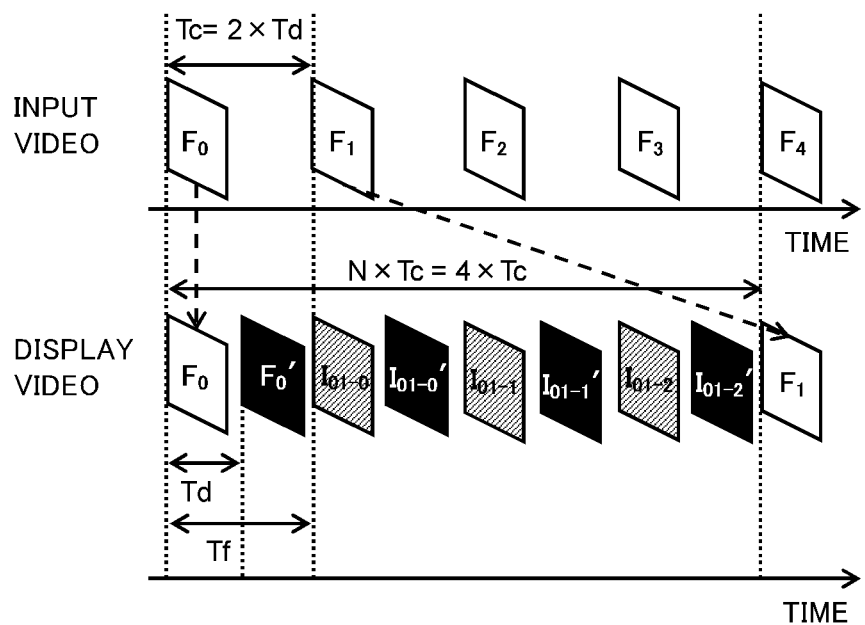
FIG. 4 is a diagram for describing a method of creating the display video from the input video by the moving-image playback device illustrated in FIG. 1.

FIGS. 3 and 4 are diagrams for describing a method of creating the display video from the input video by the moving-image playback device 100 illustrated in FIG. 1. FIG. 3 illustrates an example in which the frame rate control circuit 110a outputs values of m=1 and n=8 to the interpolation image generation circuit 110b when N=4 and Tc/Td=2. Since the value of m=1 is given, the re-display image of the input image F or the interpolation image I is not output into the display video. When the number "a" interpolation images I is calculated, seven interpolation images $I_{01-0}$ to $I_{01-6}$ are output between the input images $F_0$ and $F_1$, which are adjacent to each other on the time series, due to the condition of a=n−1=7.

In contrast, FIG. 4 illustrates an example in which the values of m=2 and n=4 are output to the interpolation image generation circuit 110b by the frame rate control circuit 110a. When the number "a" of interpolation images I is calculated, three interpolation images $I_{01-0}$, $I_{01-1}$, and $I_{01-2}$ are output between the input images $F_0$ and $F_1$ due to the condition of a=n−1=3. In addition, since the value of m=2 is given, re-display images $F_0'$, $I_{01-0}'$, $I_{01-1}'$, and $I_{01-2}'$, which are the same images as an immediately preceding image, are again output behind the input image $F_0$ and interpolation images $I_{01-0}$, $I_{01-1}$, and $I_{01-2}$.

Thus, according to the moving-image playback device 100 of the first embodiment, when the user designates the time extension magnification N of the display video with respect to the input video, it is possible to determine the combination (m, n) of the natural number, which satisfies the equation of n×m=N×Tc/Td, in a short time. For this reason, it is possible to slowly play back the display video in a smooth manner by executing the frame interpolation with respect to the input video in real time. In addition, since the combination (m, n) of the natural number can be determined with a simple circuit configuration, it is possible to manufacture the moving-image playback device at low cost.

Second Embodiment

The first embodiment has illustrated a method of creating the display video in a case where both values of N and Tc/Td are the natural numbers. However, a second embodiment illustrates a case where the values of N and Tc/Td are non-natural numbers. Moreover, reference numerals in common with the attached reference numerals in the first embodiment indicate the same component, and thus the description thereof will not be presented. Hereinafter, different parts will be described in detail.

Figure 5:
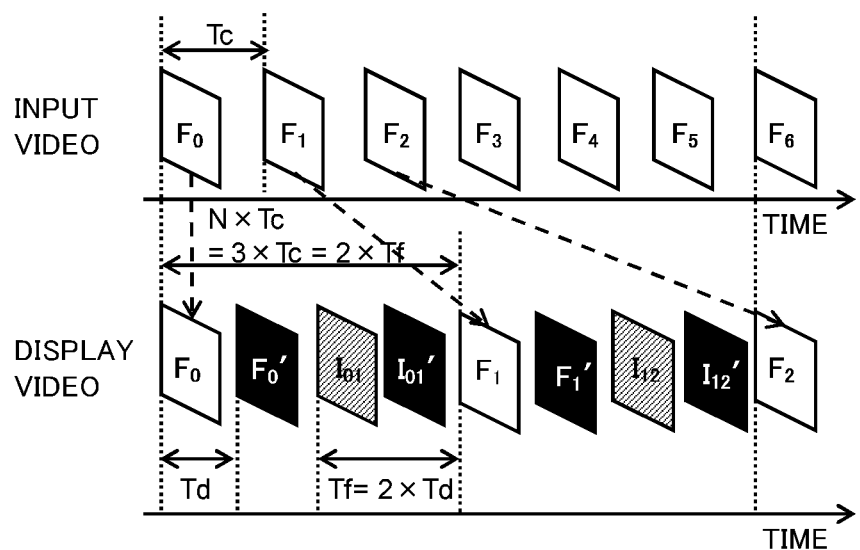
FIG. 5 is a diagram for describing a method of creating a display video from an input video by a moving-image playback device according to a second embodiment of the invention.

FIG. 5 is a diagram for describing a method of creating a display video from an input video by a moving-image playback device 100 according to a second embodiment of the invention. In this example, the value of Tc is not an integer multiple, but is a simple integer ratio. The relation of the input image F and the interpolation image I on the time series is expressed by the following Equation 4.

$$3 \times Tc = 4 \times Td \quad \text{Equation 4}$$

Therefore, the following Equation 5 is derived from Equations 3 and 4.

$$n \times m = N \times Tc/Td = N^*(4/3) \quad \text{Equation 5}$$

Since the left-side value of Equation 5 is the natural number, the value of N should be set such that the value of N×Tc/Td becomes the natural number. In addition, since the value of Tc/Td is the non-natural number, the value of N may be a rational number which is not the natural number. Specifically, when a value of k is set to be an integer of 1 or more, the value of N is expressed by the following Equation 6.

$$N = k \times (Td/Tc) \quad \text{Equation 6}$$

Therefore, from Equations 4 and 6, the candidates of the time extension magnification N are as follows.

N=3/4, 6/4, 9/4, 12/4, . . . .

In the second embodiment, accordingly, as the time extension magnification N, discrete values of these rational numbers are displayed as an input candidate such that the user can select the value N. If any value, which satisfies Equation 6 as the value of N, is selected, the frame rate control circuit 110a determines to output the combination (m, n) of the natural number so as to satisfy Equation 5.

In the example of FIG. 5, since the value of Tc/Td is 4/3 (Tc/Td=4/3), if the value of N is selected as 3 (N=3) from the candidates, the value of n×m becomes 8 (n×m=8) from Equation 5. There are the combinations (m, n) of the natural number such as (1, 4), (2, 2), and (4, 1), but the combination (2, 2) is output here. When the number "a" of interpolation images I is calculated, one interpolation image $I_{01}$ is output between the input images $F_0$ and $F_1$ due to the condition of a=n−1=1. In addition, since the value of m=2 is given, re-display images $F_0'$ and $I_{01}'$, which are the same images as an immediately preceding image, are again output behind the input image $F_0$ and interpolation image $I_{01}$.

Thus, according to the moving-image playback device 100 of the second embodiment, even when the value of Tc/Td is the non-natural number, as in the first embodiment, it is possible to determine the combination (m, n) of the natural number, which satisfies the equation of n×m=N×Tc/Td, in a short time by controlling the input of N such that the value of N×Tc/Td becomes the natural number.

Further, in practice, the value of N may be converted into a value for appropriately satisfying Equation 6 in the frame rate control circuit 110a without being limited to the value of the input N. For example, it can be achieved that the frame rate control circuit 110a converts the input time extension magnification N into the nearest value in values of an integer multiple of Td/Tc when a value of Tc/Td is a non-natural number.

Third Embodiment

The first embodiment indicates the method of creating the display video when both values of N and Tc/Td are the natural number, and the second embodiment indicates the method of creating the display video when the value of N and Tc/Td are the non-natural number, but the value of N×Tc/Td is the natural number. However, a third embodiment indicates a case where the value of N is a positive real number of the non-natural number and the value of N×Tc/Td is a positive real number of the non-natural number. Moreover, reference numerals in common with the attached reference numerals in the first embodiment indicate the same component, and thus the description thereof will not be presented. Hereinafter, different parts will be described in detail.

Figure 6:
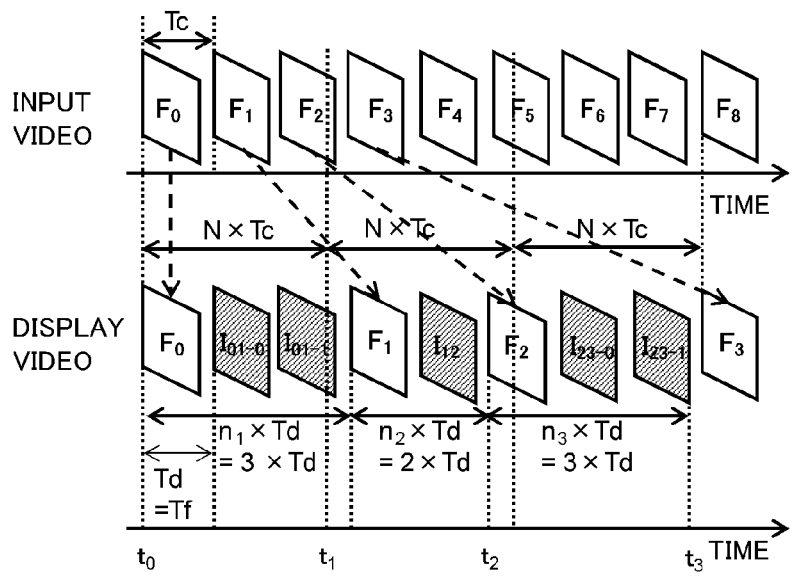
FIG. 6 is a diagram for describing a method of creating a display video from an input video by a moving-image playback device according to a third embodiment of the invention.

FIG. 6 is a diagram for describing a method of creating a display video from an input video by a moving-image playback device 100 according to the third embodiment of the invention. In this example, N=8/3, Tc=Td, and N×Tc/Td=8/3. Accordingly, the relation of n×m=N×Tc/Td=8/3 is obtained from Equation 3. However, the combination (m, n) of the natural number for satisfying this relation does not exist.

Therefore, in the third embodiment, as illustrated in FIG. 6, the values of "m and n" are not fixed but dynamically controlled such that display time of the input image in time-series images of the display video approaches a multiple of N×Tc. In an example of FIG. 6, the value of "m" is fixed to 1, and values of $n_1$ to $n_3$ are varied. The following indicates an example of a calculating method of $n_1$ to $n_3$ when a start time of the input video $F_0$ is set to $t_0$ and $t_1$, $t_2$, and $t_3$ are set at intervals of N×Tc.

The interval of $t_0$, $t_1$, $t_2$, and $t_3$ is represented by Td as follows.

$$t_1 - t_0 = 1 \times 8/3 \times Tc$$
$$= (2 + 2/3) \times Tc$$
$$= (2 + 2/3) \times Td$$

$$t_2 - t_0 = 2 \times 8/3 \times Tc$$
$$= (5 + 1/3) \times Tc$$
$$= (5 + 1/3) \times Td$$

$$t_3 - t_0 = 3 \times 8/3 \times Tc$$
$$= (8 + 0/3) \times Tc$$
$$= (8 + 0/3) \times Td$$

Therefore, the values of $n_1$, $n_2$, and $n_3$ are calculated as follows so as to specify the number of interpolation images I, which are output to the intervals of input images, that is, between $F_0$ and $F_1$, $F_1$ and $F_2$, and $F_1$ and $F_2$, respectively.

$$n_1 = \text{round}(2 + 2/3) = 3$$

$$n_2 = \text{round}(3 + 1/3) - n_1 = 2$$

$$n_3 = \text{round}(8 + 0/3) - (n_1 + n_2) = 3$$

Here, the "round ( )" represents the function to round off. The frame rate control circuit 110a sequentially outputs the values of "n", for example, $n_1=3$, $n_2=2$, and $n_3=3$. In the case of FIG. 6, since the condition of $n_1-1=2$ is given, two interpolation images $I_{01\text{-}0}$ and $I_{01\text{-}1}$ are output between the input images (between $F_0$ and $F_1$). In addition, since the condition of $n_2-1=1$ is given, one interpolation image $I_{12}$ is output between $F_1$ and $F_2$. Similarly, since the condition of $n_3-1=2$ is given, two interpolation images $I_{23\text{-}0}$ and $I_{23\text{-}1}$ are output between $F_1$ and $F_2$. The subsequent $n_4$ or later are also calculated in the same manner and sequentially output.

Thus, according to the moving-image playback device 100 of the third embodiment, even when the value of N becomes the positive real number of the non-natural number and the value of N×Tc/Td becomes the positive real number of the non-natural number, it is possible to dynamically change the number of interpolation images which are output between the input images. For this reason, as in the first embodiment, it is possible to slowly play back the display video in a smooth manner by executing the frame interpolation with respect to the input video in real time.

In addition, generally, there is a case where the values of Tc and Td may be dynamically changed. In the moving-image playback device 100 according to the third embodiment, since the values "m and n" can be re-calculated in short time for each output image frame with respect to the values of Tc and Td input to the frame rate control circuit 110a, based on Equation 3, it is possible to easily cope with the above case.

Fourth Embodiment

Figure 7:
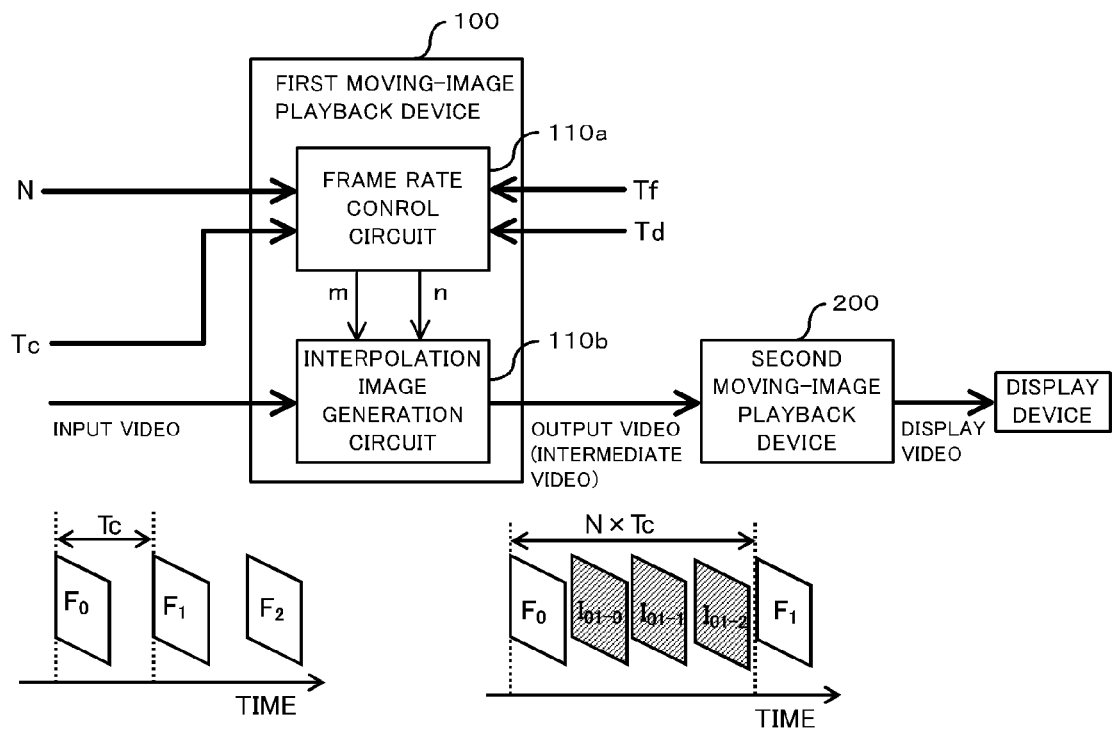
FIG. 7 is a block diagram illustrating a configuration example of a moving-image playback device according to a fourth embodiment of the invention.

FIG. 7 is a block diagram illustrating a configuration example of a moving-image playback device 100 according to a fourth embodiment of the invention. The moving-image playback device 100 (hereinafter, referred to as a "first moving-image playback device") according to the fourth embodiment performs the frame interpolation with respect to the input video based on the time extension magnification N as in the first embodiment, but does not perform the video display. The first moving-image playback device 100 is connected to a second moving-image playback device 200 and outputs an output video (intermediate video) which is obtained by processing the input video with the time extension magnification N. The second moving-image playback device 200 is a device which converts the frame rate of the output video output by the first moving-image playback device 100 and outputs the display video to the display device of a connection destination. That is, the second moving-image playback device 200 simply performs only frame conversion without performing the time extension.

When the frame rate of the input video is Fc and the frame rate of the display video is Fd, the frame rate conversion from Fc to Fd is represented as the following Equation 7 using a frame rate Fi of the intermediate video.

$$Fd = Fc^{*}(Fi/Fc)^{*}(Fd/Fi) \qquad \text{Equation 7}$$

That is, the frame rate conversion from Fc to Fd can be divided into a first frame rate conversion which converts the frame rate Fc of the input video into the frame rate Fi of the intermediate video and a second frame rate conversion which converts the frame rate Fi of the intermediate video into the frame rate Fd of the display video. In the example of FIG. 7, the first moving-image playback device 100 executes the first frame rate conversion, and the second moving-image playback device 200 executes the second frame conversion.

The following example indicates a case where the frame rate conversion is divided when the value of N is the natural number and the value of N×Tc/Td is not the natural number and thus the first frame rate conversion is performed such that both values of N and Tc/Td become the natural number.

Figure 8:
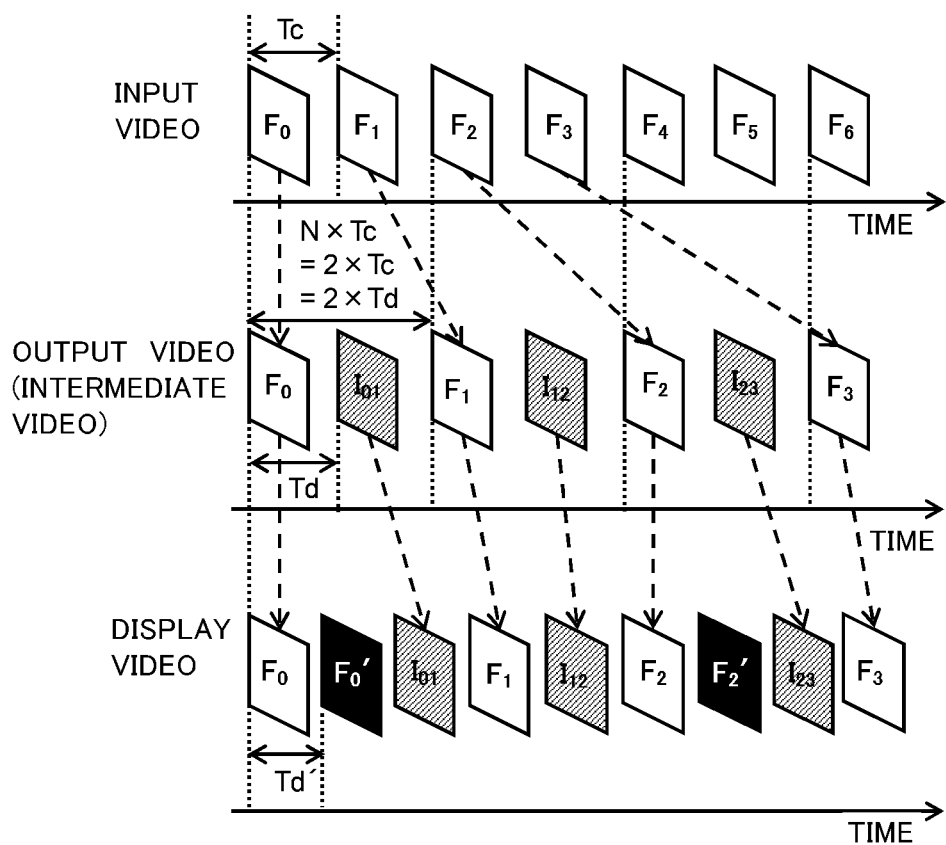
FIG. 8 is a diagram for describing a method of creating a display video from an input video by the moving-image playback device according to the fourth embodiment of the invention.

FIG. 8 is a diagram for describing a method of creating the display video from the input video by the moving-image playback device according to the fourth embodiment of the invention. In the configuration of the first moving-image playback device 100, there is no change in the relation of N, Tc, Tf, and Td same as in the first embodiment. However, the output video of the first moving-image playback device 100 differs from the display video of the display device. For this reason, the meaning of each symbol is modified as follows.

Tc: Interval of the input image
Tf: Updating interval of the content of the output image
Td: Interval of the output image in the output video
N: Time extension magnification of the output video with respect to the input video
m: Number of same images which are continuously output to the output video
n: "a" (number of independent interpolation images I created between input images)+1

In the example of FIG. 8, the conditions of Tc=Td and N=2 are given. At this time, the frame rate control circuit 110a of the first moving-image playback device 100 outputs the value of the combination (m, n) of the natural number, which satisfies the relation of n×m=2 based on Equation 3, to the interpolation image generation circuit 110b. That is, the first moving-image playback device 100 extends the output video twice with respect to the input video in a time direction and also executes the first frame rate conversion.

In contrast, the second moving-image playback device 200 simply converts the frame rate Fi of the intermediate video into 1.25 times the frame rate Fd without performing the time extension of the display video with respect to the input intermediate video. In this example, the latter conversion is achieved by re-displaying the immediately preceding image by one frame for every four frames of the intermediate video which is input to the second moving-image playback device 200. When an interval of the display image in the display video to be finally output by the second moving-image playback device 200 is represented as Td', the relation of Td/Td'=Fd/Fi=5/4 is satisfied. When the natural number is input as the time extension magnification N, the value of N×Tc/Td' is the non-natural number.

Therefore, according to the fourth embodiment, the frame rate conversion is executed in two stages of the first moving-image playback device 100 and the second moving-image playback device 200. Thus, even in a case where the value of N×Tc/Td' is the non-natural number, it is possible to generate the display video of the frame rate Fd corresponding to the display device by executing the second frame conversion in the second moving-image playback device 200 although the values of N and Tc/Td input to the first moving-image playback device 100 are the natural numbers. That is, it is possible to generate the display video of a desired frame rate while simplifying the calculation in the frame rate control circuit 110a of the first moving-image playback device 100. Further, according to the examples of FIG. 7 and FIG. 8, the first frame conversion and the second frame conversion are performed in separate devices, but it may be configured to be performed in a single device.

While certain embodiments have been described these embodiments have been presented by way of example only, and are not intended to limit the scope of the inventions. Indeed, the novel embodiments described herein may be embodied in a variety of other forms: furthermore various omissions, substitutions and changes in the form of the embodiments described herein may be made without departing from the spirit of the inventions. The accompanying claims and there equivalents are intended to cover such forms or modifications as would fall within the scope and spirit of the invention.

What is claimed is:

1. A moving-image playback device comprising:
a frame rate control circuit that uses an input interval Tc of a plurality of input images in an input video in which the plurality of input images are arranged in time series, a display interval Td of a plurality of display images in a display video in which the plurality of display images are arranged in time series, and a time extension magnification N of the display video with respect to the input video as inputs and that outputs the number "m" of images of the same content which is continuously output in the display video and a constant "n" greater by one than the number "a" of interpolation images which are created with an independent display content and are each inserted between the input images; and
an interpolation image generation circuit that inputs the input video, creates the number "a" of interpolation images based on the constant "n", and creates an immediately preceding input image or the interpolation image and a re-display image of the same content between the input images in time series based on the number "m" of images to output the display video of the time extension magnification N,
wherein the frame rate control circuit outputs the number "m" of images and the constant "n", which are determined based on a combination (m, n) of a natural number for satisfying an equation of n×m=N×Tc/Td, to the interpolation image generation circuit.

2. The moving-image playback device according to claim 1, wherein the frame rate control circuit specifies the number "a" of interpolation images from the equation, as a condition of m=1.

3. The moving-image playback device according to claim 1, wherein the frame rate control circuit outputs the number "m" of images and the constant "n", which are determined based on the combination (m, n) of the natural number for satisfying an equation of n×m=N×Tc/Td, when values of N and Tc/Td are natural numbers.

4. The moving-image playback device according to claim 1, wherein the frame rate control circuit inputs a value of an integer multiple of Td/Tc as the time extension magnification N when a value of Tc/Td is a non-natural number, and outputs the number "m" of images and the constant "n", which are determined based on the combination (m, n).

5. The moving-image playback device according to claim 1, wherein the frame rate control circuit converts the input time extension magnification N into the nearest value in values of an integer multiple of Td/Tc when a value of Tc/Td is a non-natural number and outputs the number "m" of images and the constant "n", which are determined based on the combination (m, n).

6. The moving-image playback device according to claim 1, wherein the frame rate control circuit dynamically controls the values of the constant "n" and the number "m" of images such that display time of the input image arranged in time series in the display video is closest to a multiple of N×Tc when the time extension magnification N and the value of the equation of N×Tc/Td are a positive real number of a non-natural number.

7. A moving-image playback device comprising:
a frame rate control circuit that uses an input interval Tc of a plurality of input images in an input video in which the plurality of input images are arranged in time series, a display interval Td of a plurality of output images in an output video in which the plurality of output images are arranged in time series, and a time extension magnification N of the output video with respect to the input video as inputs and that outputs the number "m" of images of the same content which is continuously output in the output video and a constant "n" greater by one than the number "a" of interpolation images which are created with an independent display content and are each inserted between the input images; and
an interpolation image generation circuit that inputs the input video, creates the number "a" of interpolation images based on the constant "n", and creates an immediately preceding input image or the interpolation image and a re-display image of the same content between the input images in time series based on the number "m" of images to output the output video of the time extension magnification N, wherein the frame rate control circuit outputs the number "m" of images and the constant "n", which are determined based on a combination (m, n) of a natural number for satisfying an equation of n×m=N×Tc/Td, to the interpolation image generation circuit, and the interpolation image generation circuit is connected to a second moving-image playback device that converts the output video of a frame rate Fi into a display video of a frame rate Fd corresponding to a display device.

\* \* \* \* \*